(12) United States Patent
Hu

(10) Patent No.: US 11,469,578 B1
(45) Date of Patent: Oct. 11, 2022

(54) FLIP-TYPE WIRE SLOT

(71) Applicant: SHENZHEN JINMING ELECTRONIC COMMERCE CO., LTD., Guangdong (CN)

(72) Inventor: Kai Hu, Guangdong (CN)

(73) Assignee: SHENZHEN JINMING ELECTRONIC COMMERCE CO., LTD., Guangdong (CN)

( * ) Notice: Subject to any disclaimer, the term of this patent is extended or adjusted under 35 U.S.C. 154(b) by 0 days.

(21) Appl. No.: 17/360,504

(22) Filed: Jun. 28, 2021

(51) Int. Cl.
*H02G 3/04* (2006.01)

(52) U.S. Cl.
CPC ................. *H02G 3/0437* (2013.01)

(58) Field of Classification Search
CPC ...... H02G 3/0418; H02G 15/013; H02G 3/08; H02G 11/02; H02G 3/32; H02G 9/025; H02G 11/00; H02G 3/185; H02G 3/0437; H02G 7/053; H02G 9/02; H02G 9/04; H02G 9/06; H02G 3/06; H02G 3/14; H02G 3/088; H02G 9/10; H02G 3/081; H02G 3/086; H02G 3/121; H02G 5/06; H02G 1/1202; H02G 1/1256; H02G 1/1295; H02G 3/083; B60R 9/065; B60R 9/055; B60R 13/0275; H01R 13/447; H01R 13/453; H01R 13/501; H01R 4/184; H01R 13/2407; H01R 2107/00; A45D 40/22
USPC .................. 292/202, 214, 256.67, 307 R, 91
See application file for complete search history.

(56) References Cited

U.S. PATENT DOCUMENTS

| | | | | |
|---|---|---|---|---|
| 2,559,009 | A * | 7/1951 | Coyle ...................... | E05D 1/04 220/841 |
| 3,761,603 | A * | 9/1973 | Hays ...................... | H02G 3/0437 174/101 |
| 4,423,284 | A * | 12/1983 | Kaplan ................. | H02G 3/0431 52/287.1 |
| 4,640,314 | A * | 2/1987 | Mock ........................ | F16L 3/26 174/101 |
| 4,857,670 | A * | 8/1989 | Frank ...................... | H02G 3/266 174/101 |
| 4,942,271 | A * | 7/1990 | Corsi ................... | H02G 3/0418 174/101 |
| 5,024,251 | A * | 6/1991 | Chapman ............. | H02G 3/0608 16/361 |
| 5,235,136 | A * | 8/1993 | Santucci .............. | H02G 3/0437 174/101 |
| 5,728,976 | A * | 3/1998 | Santucci .............. | H02G 3/0418 174/68.3 |
| 6,107,576 | A * | 8/2000 | Morton ................ | H02G 3/0418 174/101 |

(Continued)

FOREIGN PATENT DOCUMENTS

FR 2425518 A * 1/1980 ........... H02G 3/0418
FR 2566373 A1 * 12/1985

*Primary Examiner* — Krystal Robinson
(74) *Attorney, Agent, or Firm* — Li & Cai Intellectual Property (USA) Office

(57) ABSTRACT

A flip-type wire slot relates to the technical field of wire slots, including: a wire slot main body and a wire slot cover, wherein one side of the wire slot cover is fixedly connected to one side of the wire slot main body, the other side of the wire slot cover is a free side, and the free side of the wire slot cover (2) is detachably connected to the other side of the wire slot main body. The adoption of the above technical solution has the advantage of facilitating the removal of the wire slot cover.

17 Claims, 5 Drawing Sheets

(56) References Cited

U.S. PATENT DOCUMENTS

| | | | |
|---|---|---|---|
| D430,543 S * | 9/2000 | Rohder .................... D13/155 |
| 6,216,746 B1 * | 4/2001 | Guebre-Tsadik .... H02G 3/0608 | |
| | | | 138/158 |
| 6,234,429 B1 * | 5/2001 | Yang ................... B60R 16/0215 |
| | | | 248/68.1 |
| 6,459,038 B1 * | 10/2002 | Waszak ................ H02G 3/0608 |
| | | | 174/68.3 |
| 7,525,044 B2 * | 4/2009 | Howell ................ H02G 3/0418 |
| | | | 138/155 |
| 2015/0204489 A1 * | 7/2015 | Baello ................. E04F 19/0463 |
| | | | 362/231 |
| 2016/0362231 A1 * | 12/2016 | Karamanos ............. E05D 15/48 |
| 2018/0090920 A1 * | 3/2018 | Shoji ................... H01M 10/482 |

\* cited by examiner

FLIP-TYPE WIRE SLOT

FIELD OF THE DISCLOSURE

The present disclosure relates to the technical field of wire slots, in particular to a flip-type wire slot.

BACKGROUND OF THE DISCLOSURE

Wire slots, also known as wiring slots, wiring grooves, and wiring troughs (different from place to place), are electrical appliances used to standardize wires such as power cords and data lines and fix them on the wall or ceiling.

The existing wire slots are all sliding, that is, the wire slot main body and the wire slot cover are assembled in a sliding manner. However, after the sliding wire slot is installed on the wall or ceiling, it is difficult to disassemble it. When the user wants to add wires, it becomes a very difficult problem. Therefore, it is in urgent need of improvement.

SUMMARY OF THE DISCLOSURE

In order to achieve the above objective, the technical solution adopted by the present disclosure is to provide a flip-type wire slot, comprising: a wire slot main body and a wire slot cover, wherein one side of the wire slot cover is fixedly connected to one side of the wire slot main body, the other side of the wire slot cover and the other side of the wire slot main body are both free sides, and the free side of the wire slot cover is detachably connected to the free side of the wire slot main body.

In a preferred embodiment of the present disclosure, an inner side of the free side of the wire slot cover is provided with a first arc-shaped structure that is concave inward, an outer side of the free side of the wire slot main body is provided with a second arc-shaped structure that is recessed inward and corresponds to the first arc-shaped structure, and the first arc-shaped structure is detachably connected to an outside of the second arc-shaped structure.

In a preferred embodiment of the present disclosure, a radius of the first arc-shaped structure is smaller than a radius of the second arc-shaped structure.

In a preferred embodiment of the present disclosure, an outer side of the free side of the wire slot cover is provided with a third arc-shaped structure that is concave inward, an inner side of the free side of the wire slot main body is provided with a fourth arc-shaped structure that is recessed inward and corresponds to the third arc-shaped structure, and the third arc-shaped structure is detachably connected to an inner side of the fourth arc-shaped structure.

In a preferred embodiment of the present disclosure, a radius of the third arc-shaped structure is greater than a radius of the fourth arc-shaped structure.

In a preferred embodiment of the present disclosure, an outer surface of the wire slot cover or an outer surface of the wire slot main body is provided with a fifth arc-shaped structure that is recessed inward.

In a preferred embodiment of the present disclosure, the wire slot main body and the wire slot cover are integrally formed.

In a preferred embodiment of the present disclosure, the wire slot main body and the wire slot cover are both made of a PVC material.

In a preferred embodiment of the present disclosure, the flip-type further comprises: a connecting piece, wherein an inner side wall of a connecting port of the connecting piece is provided with a raised limiting strip for the fifth arc-shaped structure to be clamped.

In a preferred embodiment of the present disclosure, the connecting member comprises at least one of a plane right-angle type, a plane three-way type, a straight-through type, a female angle type and a male angle type.

After adopting the above technical solution, the beneficial effects of the present disclosure are as follows.

1. In the present disclosure, one side of the wire slot cover is fixed to one side of the wire slot main body, and the other side of the wire slot cover is detachably connected to the other side of the wire slot main body. This arrangement makes the wire slot cover can be opened directly along the free side, which is convenient to replace the wires in the wire slot main body, especially when the whole product is installed on the wall, the flip-type wire slot of the present disclosure is easier to open compared to existing products.

2. In the present disclosure, the inner side of the free side of the wire slot cover is provided with a first arc-shaped structure, and the outer side of the free side of the wire slot main body is provided with a second arc-shaped structure. During assembly, the first arc-shaped structure overlaps the outside of the second arc-shaped structure. Because the arc-shaped structures will abut against each other, the wire slot cover and the wire slot main body can be assembled together, and the design of the arc-shaped structure will also make the disassembly smoother, so that the user just flips up the wire slot cover along the free side, then the wire slot cover can be opened.

BRIEF DESCRIPTION OF THE DRAWINGS

In order to explain the embodiments of the present disclosure or the technical solutions in the prior art more clearly, the following will briefly introduce the drawings that need to be used in the description of the embodiments or the prior art. Obviously, the drawings in the following description are only some embodiments of the present disclosure. For those of ordinary skill in the art, other drawings can be obtained based on these drawings without creative labor.

Figure 1:
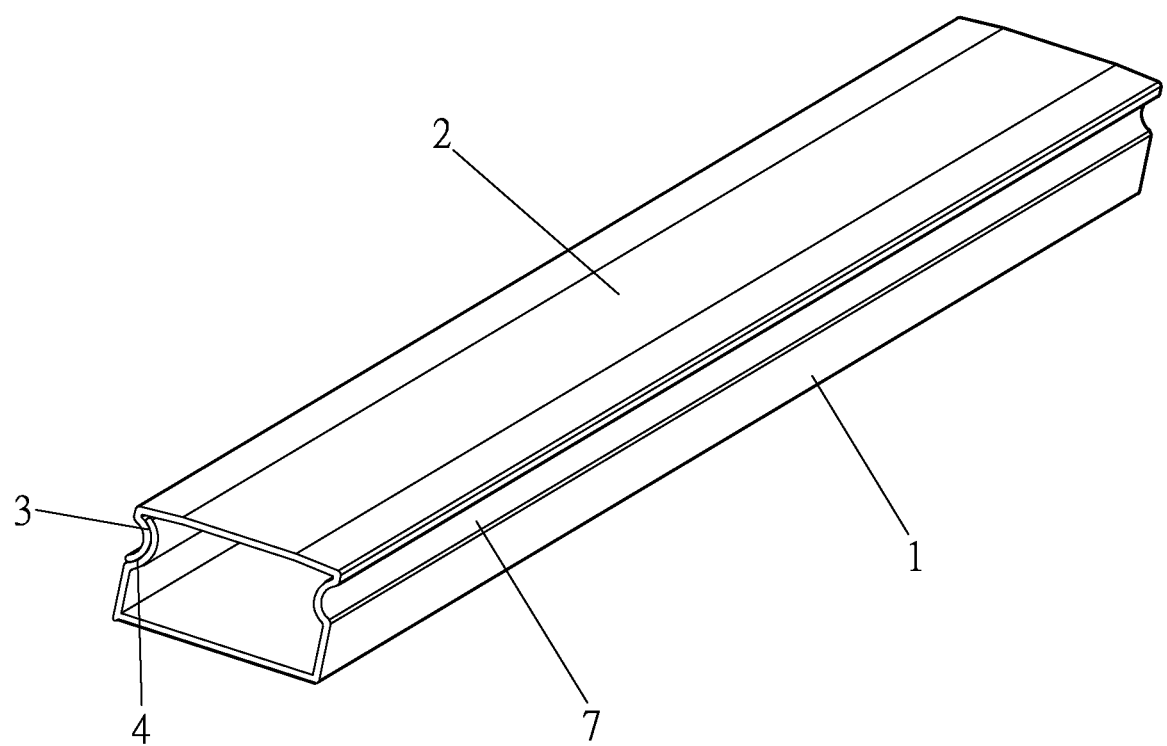
FIG. 1 is a schematic structural diagram of Embodiment 1 of the present disclosure.

Reference numeral: 1. wire slot main body; 2. wire slot cover; 3. first arc-shaped structure; 4. second arc-shaped structure; 5. third arc-shaped structure; 6. fourth arc-shaped structure; 7. fifth arc-shaped structure; 8. connecting member; 9. limiting strip.

DETAILED DESCRIPTION OF THE EXEMPLARY EMBODIMENTS

The present disclosure will be further described in detail below in conjunction with the accompanying drawings.

This specific embodiment is only an explanation of the present disclosure, and it is not a limitation of the present disclosure. After reading this specification, those skilled in the art can make modifications to this embodiment that do not create any contribution as needed, however, as long as it is within the scope of the claims of the present disclosure, it is protected by the patent law.

Embodiment 1: the present embodiment relates to a flip-type wire slot, as shown in FIGS. 1-4, comprising: a wire slot main body 1 and a wire slot cover 2, wherein one side of the wire slot cover 2 is fixedly connected to one side of the wire slot main body 1, the other side of the wire slot cover 2 and the other side of the wire slot main body 1 are both free sides, and the free side of the wire slot cover 2 is detachably connected to the free side of the wire slot main body 1. Since one side of the wire slot cover 2 is fixedly connected, and the other side is detachably connected to the other side of the wire slot main body 1, this arrangement enables the wire slot cover 2 to be directly opened along the free side for easy replacement of the wires in the wire slot main body 1, especially when the whole product is installed on the wall, the flip-type wire slot of the present disclosure is easier to open compared to existing products. In addition, since one side of the wire slot cover 2 is fixedly connected to the wire slot main body 1, it is more convenient to carry, and the slot cover 2 will not be missing.

Figure 2:
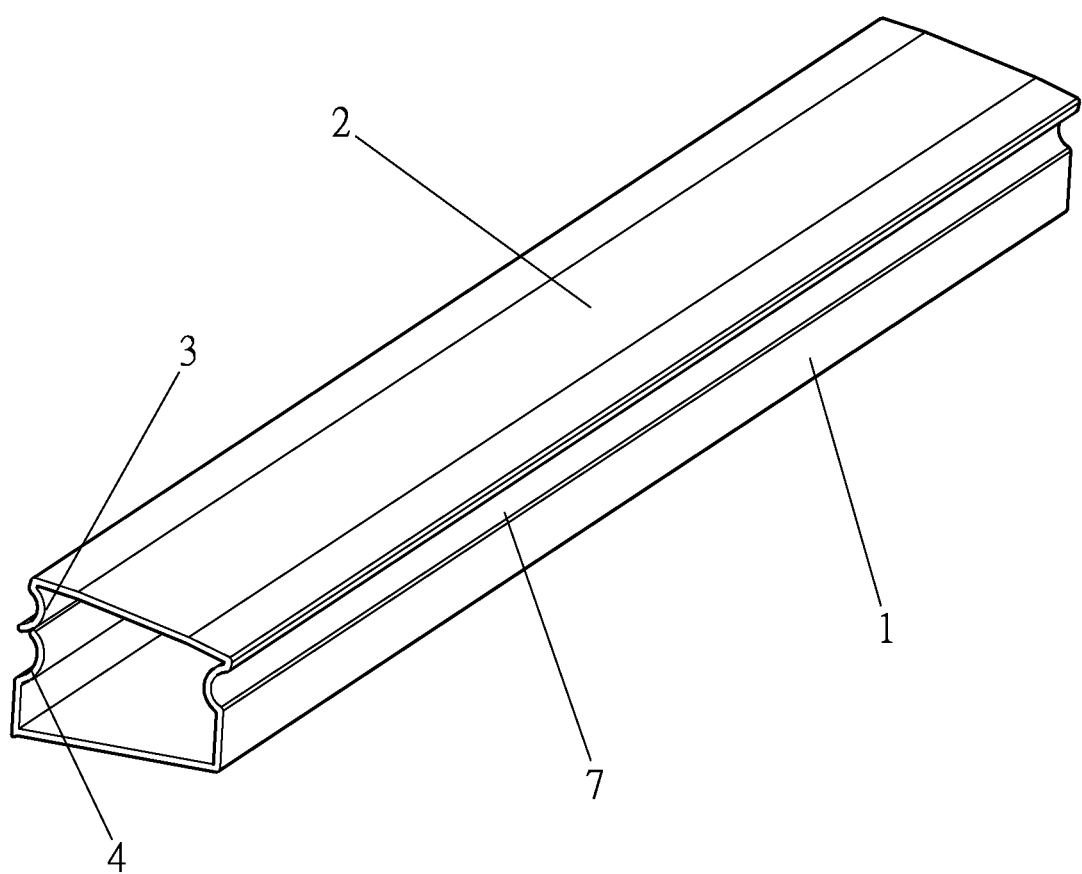
FIG. 2 is a schematic structural diagram of another state of Embodiment 1 of the present disclosure.

In the present embodiment, specifically, as shown in FIG. 1 to FIG. 2, an inner side of the free side of the wire slot cover 2 is provided with a first arc-shaped structure 3 that is concave inward, an outer side of the free side of the wire slot main body 1 is provided with a second arc-shaped structure 4 that is recessed inward and corresponds to the first arc-shaped structure 3, and the first arc-shaped structure 3 is detachably connected to an outside of the second arc-shaped structure 4. During assembly, the first arc-shaped structure 3 overlaps the outside of the second arc-shaped structure 4. Because the arc-shaped structures will abut against each other, the wire slot cover 2 and the wire slot main body 1 can be assembled together, and the design of the arc-shaped structure will also make the disassembly smoother, so that the user just flips up the wire slot cover 2 along the free side, then the wire slot cover 2 can be opened.

In order to make the assembly effect between the wire slot cover 2 and the wire slot main body 1 better, the radius of the first arc-shaped structure 3 is smaller than the radius of the second arc-shaped structure 4.

In the present embodiment, as shown in FIGS. 1 and 2, the flip-type wire slot is square, and the wire slot main body 1 and the wire slot cover 2 are both made of a PVC material. In addition, the wire slot main body 1 and the wire slot cover 2 are integrally formed.

Figure 5:
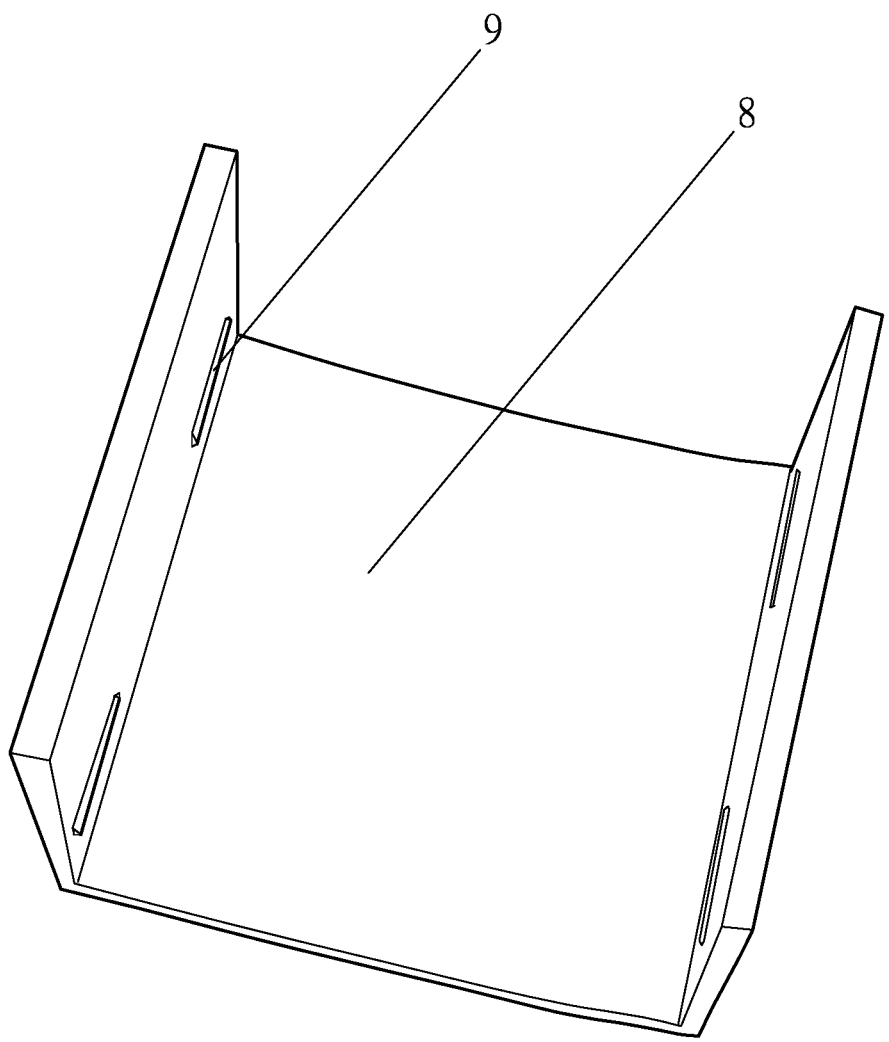
FIG. 5 is a schematic view of the structure of the connecting member.

As a preferred solution, as shown in FIGS. 1 and 2, an outer surface of the wire slot cover 2 or an outer surface of the wire slot main body 1 is provided with a fifth arc-shaped structure 7 that is recessed inward. As shown in FIG. 5, the flip-type wire slot further comprises a connecting piece 8, wherein an inner side wall of a connecting port of the connecting piece 8 is provided with a raised limiting strip 9 for the fifth arc-shaped structure 7 to be clamped. When assembling, the connecting member 8 can be slid into the flip-type wire slot along the connecting port; the connecting piece 8 can also be directly snapped in from the upper side of the wire slot cover 2. When disassembling, the connecting member 8 can slide out of the flip-type wire slot along the connecting port, and the connecting member 8 can also be pulled out directly from the upper side of the wire slot cover 2. After the flip-type wire slot and the connecting member 8 are installed on the wall, the connecting member 8 can be pulled out directly, which is much more convenient than the existing connecting member 8.

Specifically, the connecting member 8 comprises at least one of a plane right-angle type, a plane three-way type, a straight-through type, a female angle type and a male angle type.

Figure 3:
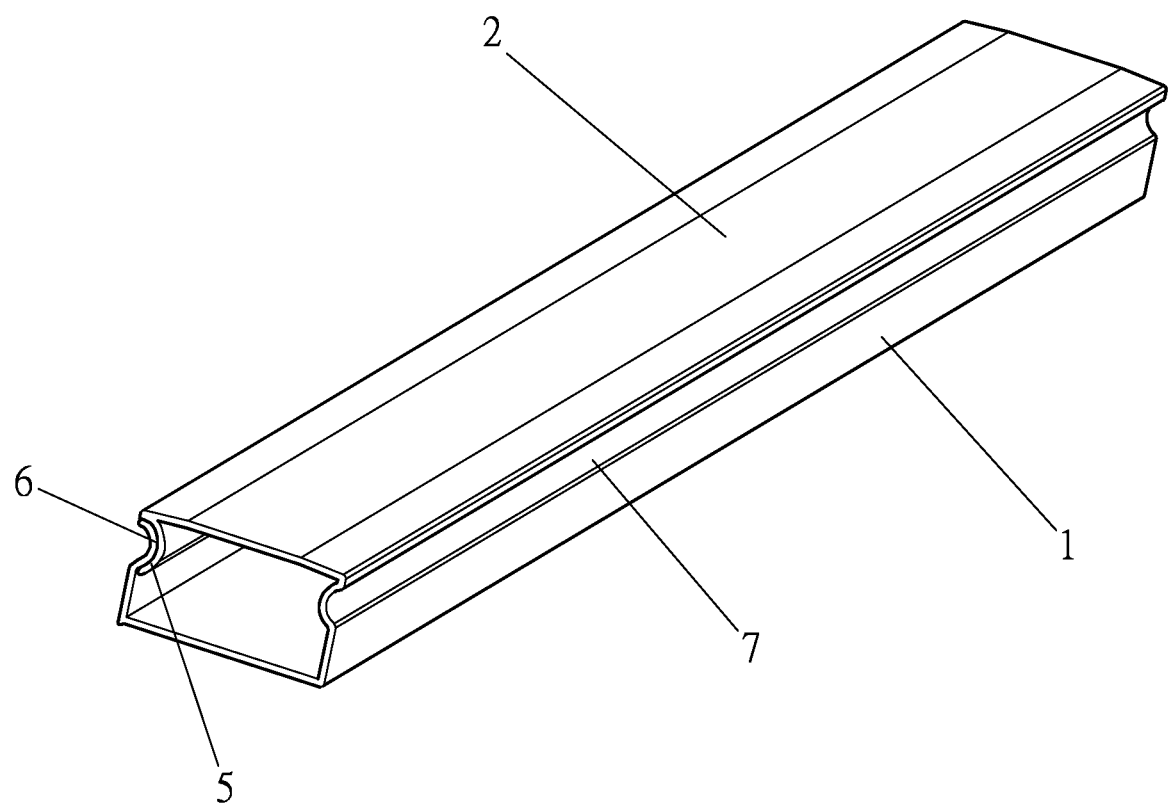
FIG. 3 is a schematic structural diagram of Embodiment 2 of the present disclosure.
Figure 4:
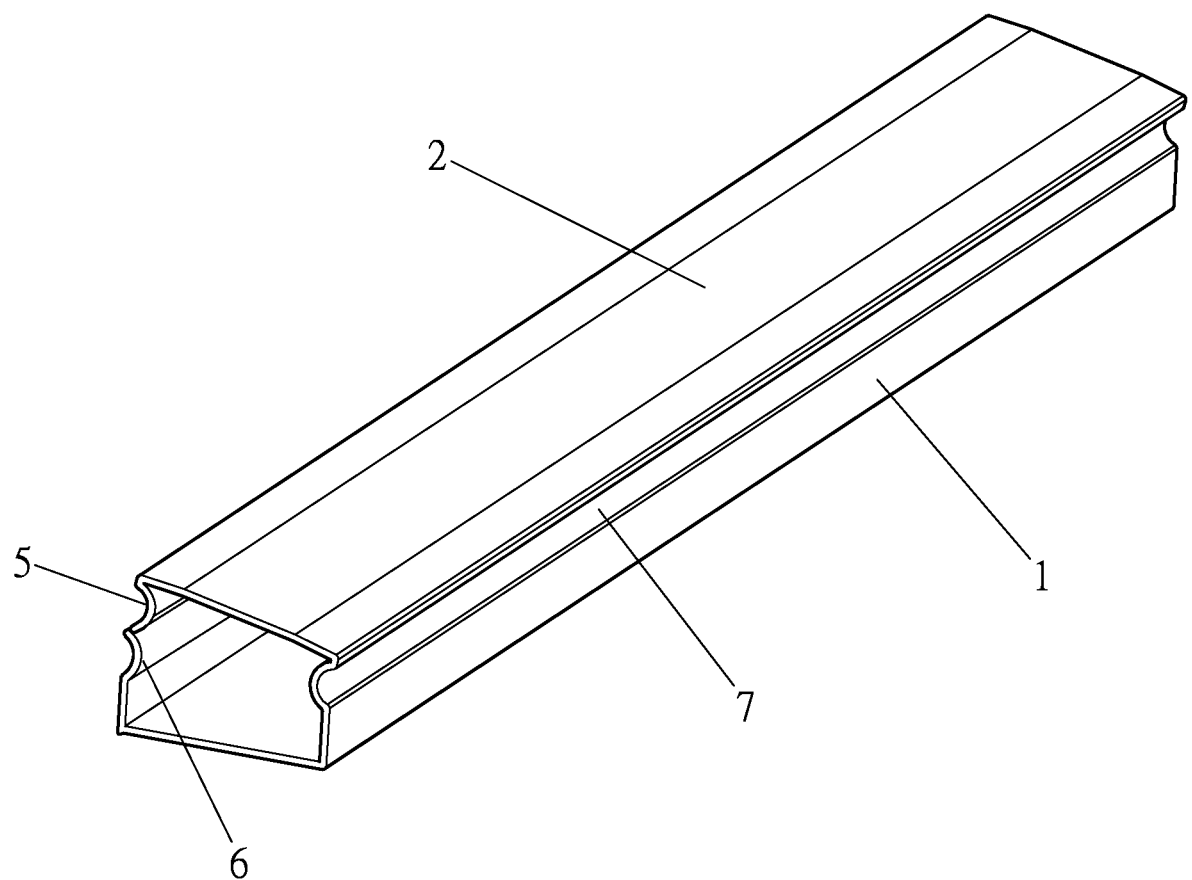
FIG. 4 is a schematic structural diagram of another state of Embodiment 2 of the present disclosure.

Embodiment 2: the difference from Embodiment 1 is that, as shown in FIGS. 3 to 4, an outer side of the free side of the wire slot cover 2 is provided with a third arc-shaped structure 5 that is concave inward. An inner side of the free side of the wire slot main body 1 is provided with a fourth arc-shaped structure 6 that is recessed inward and corresponds to the third arc-shaped structure 5, and the third arc-shaped structure 5 is detachably connected to an inner side of the fourth arc-shaped structure 6. When assembling, the third arc-shaped structure 5 overlaps the inside of the fourth arc-shaped structure 6. Because the arc-shaped structures will abut against each other, so that the wire slot cover 2 and the wire slot main body 1 can be assembled together. The design of the arc-shaped structure will also make the disassembly smoother, so that the user just flips up the wire slot cover 2 along the free side, then the wire slot cover 2 can be opened.

In order to make the assembly effect between the wire slot cover 2 and the wire slot main body 1 better, the radius of the third arc-shaped structure 5 is larger than the radius of the fourth arc-shaped structure 6.

The working principle of the present invention is roughly as follows. Since one side of the wire slot cover 2 is fixedly connected, and the other side is detachably connected to the other side of the wire slot main body 1, this arrangement enables the wire slot cover 2 to be directly opened along the free side for easy replacement of the wires in the wire slot main body 1, especially when the whole product is installed on the wall, the flip-type wire slot of the present disclosure is easier to open compared to existing products. In addition, since one side of the wire slot cover 2 is fixedly connected to the wire slot main body 1, it is more convenient to carry, and the slot cover 2 will not be missing.

The above are only used to illustrate the technical solutions of the present disclosure and not to limit them. Other modifications or equivalent substitutions made by those of ordinary skill in the art to the technical solutions of the present disclosure shall be covered as long as they do not deviate from the spirit and scope of the technical solutions of the present disclosure, it shall be included within the scope of the claims of the present disclosure.

What is claimed is:

1. A flip-type wire slot, comprising: a wire slot main body (1) and a wire slot cover (2), wherein one side of the wire slot cover (2) is fixedly connected to one side of the wire slot main body (1), the other side of the wire slot cover (2) and the other side of the wire slot main body (1) are both free sides, and the free side of the wire slot cover (2) is detachably connected to the free side of the wire slot main body (1); wherein an inner side of the free side of the wire slot cover (2) is provided with a first arc-shaped structure (3) that is concave inward, an outer side of the free side of the wire slot main body (1) is provided with a second arc-shaped structure (4) that is recessed inward and corresponds to the first arc-shaped structure (3), and the first arc-shaped structure (3) is detachably connected to an outside of the second arc-shaped structure (4).

2. The flip-type wire slot according to claim 1, wherein a radius of the first arc-shaped structure (3) is smaller than a radius of the second arc-shaped structure (4).

3. The flip-type wire slot according to claim 1, wherein an outer side of the free side of the wire slot cover (2) is provided with a third arc-shaped structure (5) that is concave inward, an inner side of the free side of the wire slot main body (1) is provided with a fourth arc-shaped structure (6) that is recessed inward and corresponds to the third arc-shaped structure (5), and the third arc-shaped structure (5) is detachably connected to an inner side of the fourth arc-shaped structure (6).

4. The flip-type wire slot according to claim 3, wherein a radius of the third arc-shaped structure (5) is greater than a radius of the fourth arc-shaped structure (6).

5. The flip-type wire slot according to claim 1, wherein an outer surface of the wire slot cover (2) or an outer surface of the wire slot main body (1) is provided with a fifth arc-shaped structure (7) that is recessed inward.

6. The flip-type wire slot according to claim 1, wherein the wire slot main body (1) and the wire slot cover (2) are integrally formed.

7. The flip-type wire slot according to claim 5, further comprising: a connecting piece (8), wherein an inner side wall of a connecting port of the connecting piece (8) is provided with a raised limiting strip (9) for the fifth arc-shaped structure (7) to be clamped.

8. The flip-type wire slot according to claim 7, wherein the connecting member (8) comprises at least one of a plane right-angle type, a plane three-way type, a straight-through type, a female angle type and a male angle type.

9. The flip-type wire slot according to claim 1, wherein the wire slot main body (1) and the wire slot cover (2) are both made of a PVC material.

10. A flip-type wire slot, comprising: a wire slot main body (1) and a wire slot cover (2), wherein one side of the wire slot cover (2) is fixedly connected to one side of the wire slot main body (1), the other side of the wire slot cover (2) and the other side of the wire slot main body (1) are both free sides, and the free side of the wire slot cover (2) is detachably connected to the free side of the wire slot main body (1); wherein an outer side of the free side of the wire slot cover (2) is provided with a third arc-shaped structure (5) that is concave inward, an inner side of the free side of the wire slot main body (1) is provided with a fourth arc-shaped structure (6) that is recessed inward and corresponds to the third arc-shaped structure (5), and the third arc-shaped structure (5) is detachably connected to an inner side of the fourth arc-shaped structure (6).

11. The flip-type wire slot according to claim 10, wherein an inner side of the free side of the wire slot cover (2) is provided with a first arc-shaped structure (3) that is concave inward, an outer side of the free side of the wire slot main body (1) is provided with a second arc-shaped structure (4) that is recessed inward and corresponds to the first arc-shaped structure (3), and the first arc-shaped structure (3) is detachably connected to an outside of the second arc-shaped structure (4);

wherein a radius of the first arc-shaped structure (3) is smaller than a radius of the second arc-shaped structure (4).

12. The flip-type wire slot according to claim 10, wherein a radius of the third arc-shaped structure (5) is greater than a radius of the fourth arc-shaped structure (6).

13. The flip-type wire slot according to claim 10, wherein an outer surface of the wire slot cover (2) or an outer surface of the wire slot main body (1) is provided with a fifth arc-shaped structure (7) that is recessed inward.

14. The flip-type wire slot according to claim 13, further comprising: a connecting piece (8), wherein an inner side wall of a connecting port of the connecting piece (8) is provided with a raised limiting strip (9) for the fifth arc-shaped structure (7) to be clamped.

15. The flip-type wire slot according to claim 14, wherein the connecting member (8) comprises at least one of a plane right-angle type, a plane three-way type, a straight-through type, a female angle type and a male angle type.

16. The flip-type wire slot according to claim 10, wherein the wire slot main body (1) and the wire slot cover (2) are integrally formed.

17. The flip-type wire slot according to claim 10, wherein the wire slot main body (1) and the wire slot cover (2) are both made of a PVC material.

* * * * *